(12) United States Patent
Nagarajan et al.

(10) Patent No.: US 8,494,280 B2
(45) Date of Patent: Jul. 23, 2013

(54) AUTOMATED METHOD FOR EXTRACTING HIGHLIGHTED REGIONS IN SCANNED SOURCE

(75) Inventors: Ramesh Nagarajan, Pittsford, NY (US); Michael R. Campanelli, Webster, NY (US); Isaiah Simmons, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1350 days.

(21) Appl. No.: 11/414,053

(22) Filed: Apr. 27, 2006

(65) Prior Publication Data

US 2007/0253620 A1 Nov. 1, 2007

(51) Int. Cl.
  *G06K 9/46* (2006.01)
(52) U.S. Cl.
  USPC ........... 382/190; 382/175; 382/176; 382/164; 382/165; 345/589; 345/591; 345/595; 358/2.1; 358/515; 358/517; 358/462
(58) Field of Classification Search
  USPC ........................................ 382/164
  See application file for complete search history.

(56) References Cited

U.S. PATENT DOCUMENTS

| | | | | |
|---|---|---|---|---|
| 3,210,552 A | * | 10/1965 | Young | 250/226 |
| 4,110,826 A | * | 8/1978 | Mollgaard et al. | 382/165 |
| 4,760,606 A | * | 7/1988 | Lesnick et al. | 382/306 |
| 5,434,953 A | * | 7/1995 | Bloomberg | 345/670 |
| 5,619,592 A | * | 4/1997 | Bloomberg et al. | 382/175 |
| 5,825,943 A | * | 10/1998 | DeVito et al. | 382/306 |
| 2004/0071362 A1 | | 4/2004 | Curry et al. | 382/274 |
| 2005/0275897 A1 | | 12/2005 | Fan et al. | 358/2.1 |
| 2006/0062453 A1 | * | 3/2006 | Schacht | 382/164 |

OTHER PUBLICATIONS

A. R. Robertson The CIE 1976 color-difference formulae Wiley InterScience / Color Research and Application Volume and Issue Number: vol. 15 Issue 3 article: Historical development of CIE recommended color difference equations.*
Kalle Karu and Anil K. Jain Locating Text in Complex Color Images Department of Computer Science, Michigan State University Pattern Recognition/Elsevier vol. 28. No. 10 1995.*
Locating Text in Color Documents N. Papamarkos, et al. Department of Electircal & Computer Engineering Democritus University of Thrace, 67100 Xanthi, Greece Copyright © 2002 Pattern Recognition Society. Published by Elsevier Science B.V.*
Image Segmentation and Classification Using Color Features Marian Stachowicz and David Lemke VIPPromCom-2002, 4th ERUASIP.*
Text Localization and Extraction from Complex Color Images S. Sabari Raju, P.B. Patil and A.G. Ramakrishnan Department of Electrical Engineering, Indian Institute of Science, Bangalore,-560 012, India.*

(Continued)

*Primary Examiner* — Chan S Park
*Assistant Examiner* — Mark Roz
(74) *Attorney, Agent, or Firm* — Luis M. Ortiz; Kermit D. Lopez; Melissa Silverstein (57) ABSTRACT

An automated method for extracting highlighted regions in a scanned text documents includes color masking of highlight regions, extracting text from highlighted regions, recognizing the characters in extracted text optically and inserting the recognized characters to new document in order to easily identify highlighted text in scanned images. Using a two-layer multi-mask compression technology configured in a scanned export image path, edges and text regions can be extracted and together with the use of mask coordinates and associated mask colors, all highlighted texts can be easily identified and extracted. Optical Character Recognition (OCR) can then be utilized to appropriate summarization of different extracted highlighted texts.

20 Claims, 5 Drawing Sheets

OTHER PUBLICATIONS

Digital Color Imaging Handbook Gaurav Sharma and Xerox Corporation 2003 CRC Press.*

L.T. Troland Journal of the Optical Society of America and Review of Scientific Instruments Aug. 1922 Report of Committee on Colorimetry for 1920-21.*

W.D. Wright, A.R.C.S. A Trichromatic Colorimeter With Spectral Primaries Transactions of the Optical Society, 1928.*

Andrew Gallagher, Improved Blue Sky Detection Using Polynomial Model Fit, IEEE 2004.*

Michael Stokes, A Standard Default Color Space for the Internet—sRGB, W3, 1996.*

Linda Shapiro et al, Computer Vision, Prentice Hall 2001.*

A. R. Robertson The CIE 1976 color-difference formulae Wiley InterScience / Color Research and Application; Volume and Issue Number: vol. 15 Issue 3; article: Historical development of CIE recommended color difference equations; 1990.*

* cited by examiner

AUTOMATED METHOD FOR EXTRACTING HIGHLIGHTED REGIONS IN SCANNED SOURCE

TECHNICAL FIELD

Embodiments are generally related to data processing methods and systems. Embodiments are also related to image processing methods and systems. Embodiments are additionally related to methods and systems for extracting highlighted regions in scanned image and text.

BACKGROUND OF THE INVENTION

There has always been a desire to highlight information on pages in order to show emphasis. Thus, the major market for highlight markers. Marker emphasis is simple and visual in nature. In the legal industry, for example, highlighted text from legal briefs is used to form new documents. An attorney may mark a document with colors demonstrating the "pros" and "cons" of a particular case for both the defendant and prosecution. Administration support is typically responsible for transcribing the highlighted portions of the document to new documents. This is a very time consuming effort.

Often, it is desirable to differentiate between regions of a document which have been "highlighted" with, for example, a highlighter pen from regions of a document which have not been highlighted. The term "highlighted" it is intended to mean herein that first marks in a document have been differentiated from remaining marks of the document by a region which has a substantially different gray scale than the background or marks of the original document. Such marks can be made, for example, by way of well known "Hi-Liter" pens, "Major Accent" pens, and other pens which produce bright but relatively transparent colors.

A variety of methods have been proposed for the detection of highlighted regions in a document. For example, the use of a color scanner has been proposed to detect regions of a document, which has been highlighted in a color different than the remainder of the document. Other processing methods utilize detection of an image, which may include shadow, mid-tone, and bright portions. The mid-tone portion may be screened with a low frequency screen to convert the image into a binary form. While meeting with some success, prior methods of detecting highlighted regions have encountered certain limitations.

Based on the foregoing it is believed that a need exists for improved image processing methods and systems, and more specifically to techniques for automatically discriminating between and extracting regions of a document which have been highlighted and regions of a document which have not been highlighted. It is believed that the implementation of such a method and system can reduce additional time and effort spent in extraction.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data-processing method and system.

It is another aspect of the present invention to provide for an improved image processing method and system.

It is an additional aspect of the present invention to provide for a method and system for automatically extracting highlighted regions in scanned text documents.

It is another aspect of the present invention to provide for a method and system for automatically extracting highlighted regions in scanned image documents.

The aforementioned aspects and other objectives and advantages can now be achieved as described herein. A method for extracting highlighted regions in a scanned text document is disclosed, which includes color masking of highlight regions, extracting text from highlighted regions, recognizing the characters in extracted text optically and inserting the recognized characters into new document.

A method is also disclosed for easily identifying highlighted text in scanned images. Using a two-layer multi-mask compression technology built into a scanned export image path, edges and text regions can be extracted and together with the use of mask co-ordinates and associated mask colors, all highlighted texts can be easily identified and extracted. Optical Character Recognition (OCR) and an appropriate summarization of different extracted highlighted texts can be then performed.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments described herein can be integrated into a software architecture that aligns separate software technologies to produce a desired effect. Components from several software systems, along with a special highlight region extraction module, can enable an automated extraction as described in greater detail herein.

Note that the embodiments can be implemented in the context of a host operating system and one or more software modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Software modules generally include instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore refer to software modules or implementations thereof. Such modules can be utilized separately or together to form a program product that can be implemented through signal-bearing media, including transmission media and recordable media. An example of such a module is module 122 and/or module 104 depicted in FIG. 1.

It is important to note that, although the embodiments are described in the context of a fully functional data-processing apparatus (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

The embodiments disclosed herein may be executed in a variety of systems, including a variety of computers running under a number of different operating systems. The computer may be, for example, a personal computer, a network computer, a mid-range computer or a mainframe computer. In the preferred embodiment, the computer is utilized as a control point of network processor services architecture within a local-area network (LAN) or a wide-area network (WAN).

Figure 1:
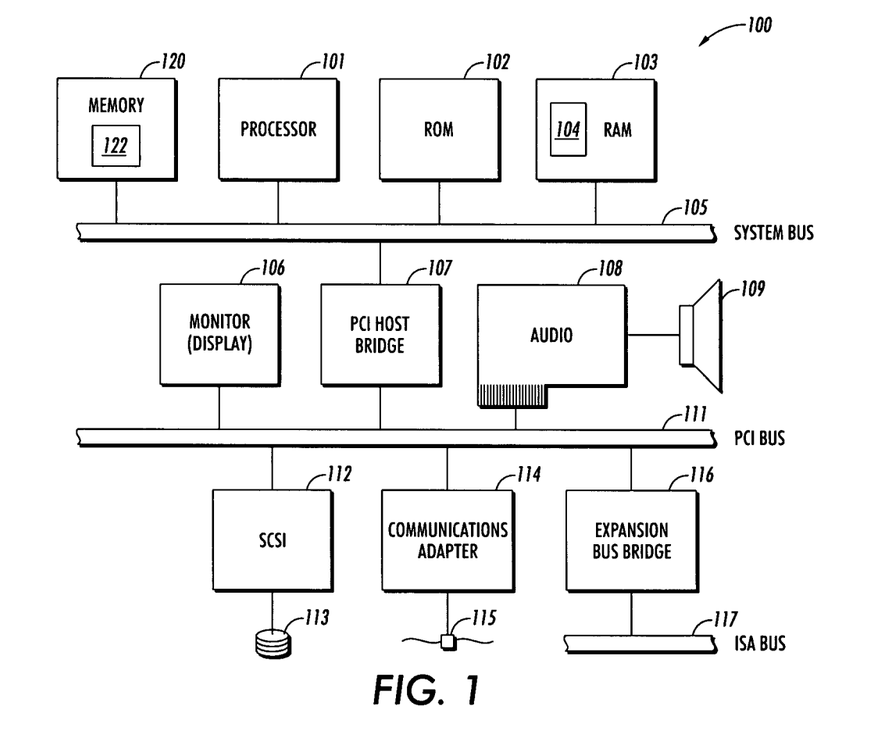
FIG. 1 illustrates a block diagram of a representative data-processing apparatus in which a preferred embodiment can be implemented.

Referring now to the drawings and in particular to FIG. 1, there is depicted a block diagram of a representative data-processing apparatus 100 (e.g., a computer) in which a preferred embodiment can be implemented. As shown, processor (CPU) 101, Read-Only memory (ROM) 102, and Random-Access Memory (RAM) 103 are connected to system bus 105 of data-processing apparatus 100. A memory 120 can also be included, which includes a module 122 as described above. Memory 120 can be implemented as a ROM, RAM, a combination thereof, or simply a general memory unit. Depending upon the design of data-processing apparatus 100, memory 120 may be utilized in place of or in addition to ROM 102 and/or RAM 103.

Data-processing apparatus 100 can include CPU 101, ROM 102, and RAM 103, which are also coupled to Peripheral Component Interconnect (PCI) local bus 111 of data-processing apparatus 100 through PCI host-bridge 107. PCI Host Bridge 107 can provide a low latency path through which processor 101 may directly access PCI devices mapped anywhere within bus memory and/or input/output (I/O) address spaces. PCI Host Bridge 107 also provides a high bandwidth path for allowing PCI devices to directly access RAM 103.

Also attached to PCI local bus 111 are communications adapter 114, small computer system interface (SCSI) 112, and expansion bus-bridge 116, communications adapter 114 is utilized for connecting data-processing apparatus 100 to a network 115. SCSI 112 is utilized to control high-speed SCSI disk drive 113. Expansion bus-bridge 116, such as a PCI-to-ISA bus bridge, may be utilized for coupling ISA bus 117 to PCI local bus 111. In addition, audio adapter 108 is attached to PCI local bus 111 for controlling audio output through speaker 109. Note that PCI local bus 111 can further be connected to a monitor 106, which functions as a display (e.g., a video monitor) for displaying data and information for a user and for interactively displaying a graphical user interface (GUI). In alternate embodiments, additional peripheral components may be added or existing components can be connected to the system bus. For example, the monitor 106 and the audio component 108 along with speaker 109 can instead be connected to system bus 105, depending upon design configurations.

Data-processing apparatus 100 also preferably includes an interface such as a graphical user interface (GUI) and an operating system (OS) that reside within machine readable media to direct the operation of data-processing apparatus 100. In the preferred embodiment, OS (and GUI) contains additional functional components, which permit network-processing components to be independent of the OS and/or platform. Any suitable machine-readable media may retain the GUI and OS, such as RAM 103, ROM 103, SCSI disk drive 113, and other disk and/or tape drive (e.g., magnetic diskette, magnetic tape, CD-ROM, optical disk, or other suitable storage media). Any suitable GUI and OS may direct CPU 101.

Further, data-processing apparatus 100 preferably includes at least one network processor services architecture software utility (i.e., program product) that resides within machine-readable media, for example a custom defined service utility 104 within RAM 103. The software utility contains instructions (or code) that when executed on CPU 101 interacts with the OS. Utility 104 can be, for example, a program product as described herein. Utility 104 can be provided as, for example, a software module such as described above.

Figure 2:
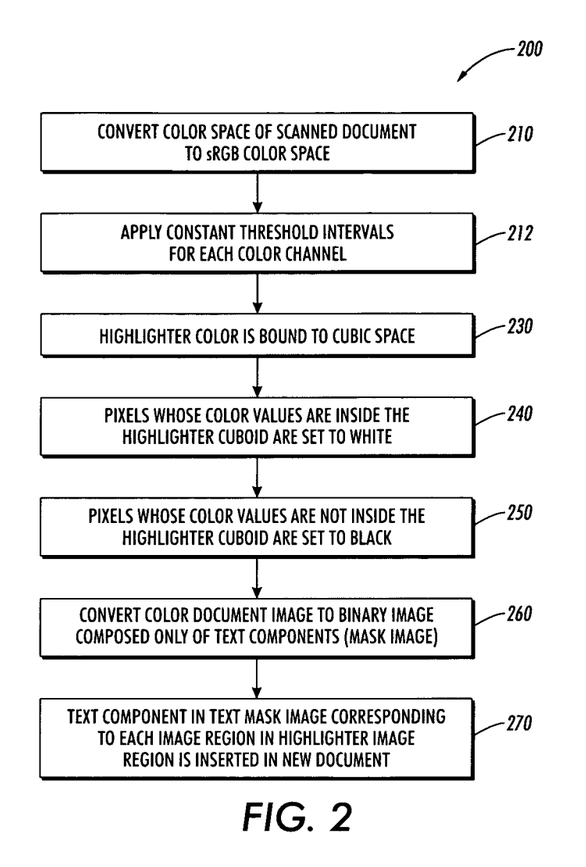
FIG. 2 illustrates a high level flow diagram of a method for extracting highlighted regions in a scanned text document, in accordance with a preferred embodiment.

Referring to FIG. 2, a high level flow diagram 200 illustrating a method for extracting highlighted regions in a scanned text document, can be implemented in accordance with a preferred embodiment. The process depicted in FIG. 2 can be referred by the term "Highlight Region Extraction," which uses a simple color threshold technique to convert a color document image to a binary image composed of only highlighted regions. The color space of the document image is first converted to a sRGB color space as depicted at block 210. Thereafter, constant threshold intervals for each color channel can be employed as indicated at block 212. Next, as described at block 230, the highlighted color can be bound to a cubic region in the sRGB color space. Pixels whose color values are inside the highlighter cuboid can be set to "white" as described at block 240, while the remaining pixels can be set to "black" as depicted at block 250. Once the highlighted region image has been created, a sequence of morphological operations can be applied to the highlighted image to close all gaps left by text.

Text Extraction can be accomplished by utilizing a fast 4-connected seed fill operation. The highlighted region image is preferably used as a seed image. For a mask image, the color document image can be binarized with a constant threshold in order to generate a binary image composed only of text components as described at block 260. Thereafter as illustrated at block 270, starting with the highlighter seed pixels, each image region can be grown until it fills a corresponding text component in the text mask image. The final output of the seed fill is an image that has only those text components in which at least one seed pixel was present in the highlighted seed image (i.e., the text covered by the highlighter).

Figure 3:
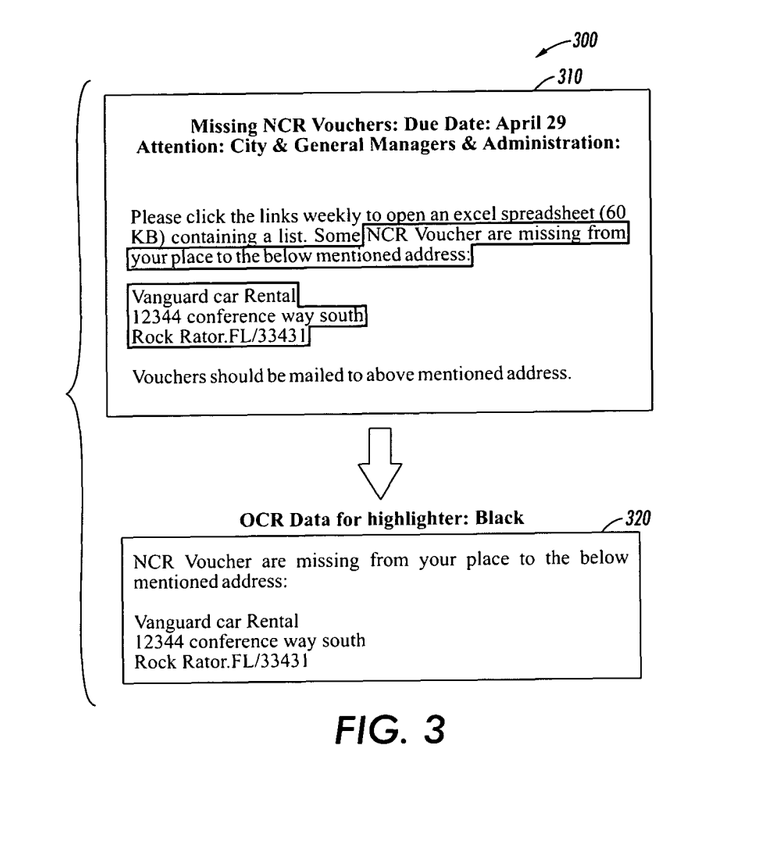
FIG. 3 illustrates an event diagram showing the results obtained by extracting highlighted regions in a scanned text document, in accordance with a preferred embodiment.

Referring to FIG. 3, an event diagram 300 is depicted, which illustrates the result obtained by extracting highlighted regions in a scanned text document, in accordance with a preferred embodiment. An OCR system can be utilized to extract the highlighted text output as described at block 320 from the sample scan text document as indicated at block 310.

Figure 4:
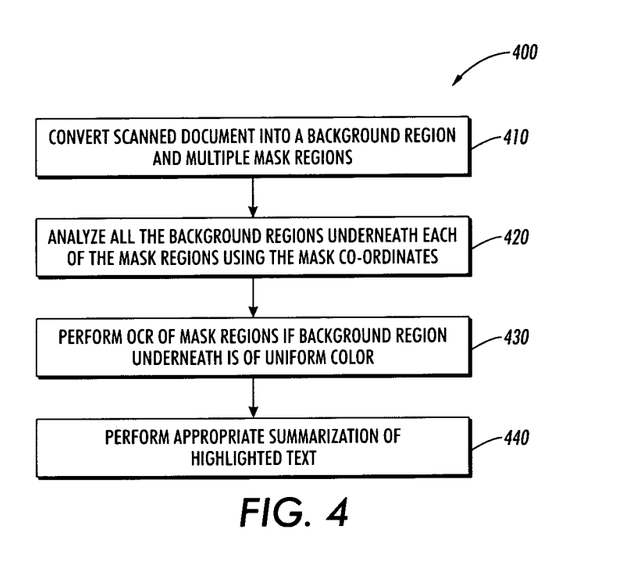
FIG. 4 illustrates a high level flow diagram depicting a method for extracting highlighted regions in a scanned image document, in accordance with a preferred embodiment.

Referring to FIG. 4, a high level flow diagram 400 is illustrated, which depicts a method for extracting highlighted regions in a scanned image document, in accordance with a preferred embodiment. The scanned document can be converted into a background image plane and multiple mask binary planes for each of the identified non-image regions (i.e., text and other edges) as indicated at block 410. Once the different mask layers are extracted, all the background regions underneath each of the mask regions (i.e., using the mask co-ordinates) can be analyzed to determine if it is purely a uniform color as described at block 420. Thereafter, as indicated at block 430, if the background region underneath constitutes a uniform color, then those mask regions are passed through an OCR engine for further processing.

Figure 5:
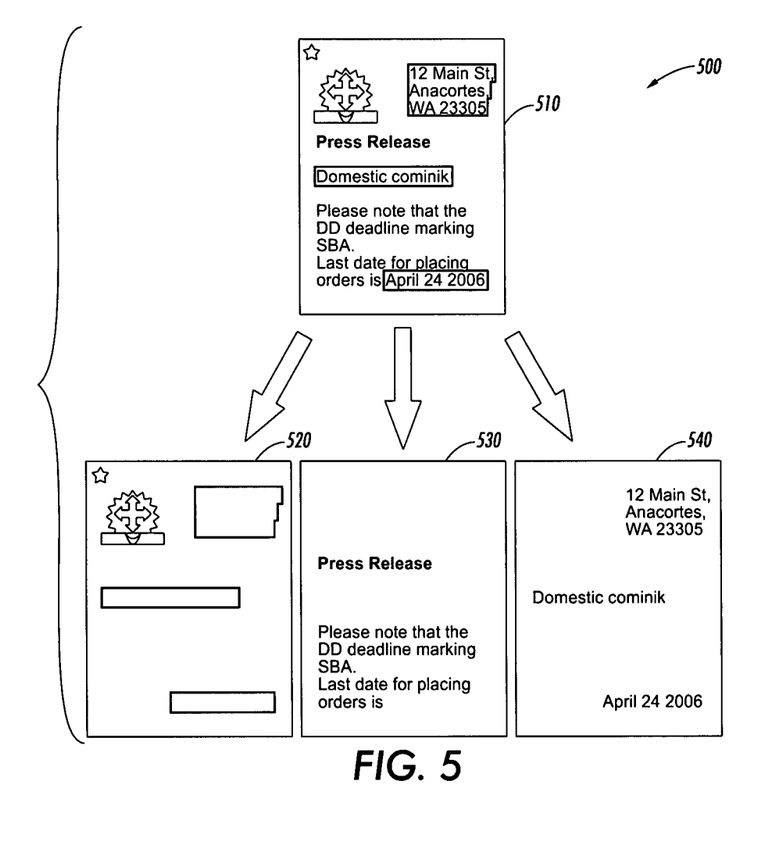
FIG. 5 illustrates an event diagram showing the results obtained by extracting highlighted regions in a scanned image document, in accordance with a preferred embodiment.

Referring to FIG. 5, an event diagram 500 illustrates the result obtained by extracting highlighted regions in a scanned image document, in accordance with a preferred embodiment. The OCR system extracts the black text mask regions under a highlighted black ink as described at block 520, and then extracts the remaining black text mask regions as depicted at block 540, followed by the background image plane as indicated at 520 from the sample scan image document as described at block 510.

OCR can be accomplished utilizing any qualified OCR system such as Nuance's OCR engine or Scansoft. The output comes back to the software module(s), where it can be represented as a STRING object. The STRING object can be written to a file on a disk, combined with other STRING objects, and embedded into documents as metadata, etc. Once the text and its associated highlight color in the background region are determined, many options are available for summarizing the results in a manner suitable for display or printing as depicted at block 440.

Based on the foregoing it can be appreciated that a system can be provided, based on one or more software modules as described above, which results in the extraction of highlighted regions in a scanned text document. Such a system can be provided as, for example, a module 104 and/or 122 for converting a scanned text document into a highlighted region comprising a highlighted text, a module 104 and/or 122 for extracting the highlighted text from the highlighted region; and a module 104 and/or 122 for optically recognizing the highlighted text in order to recognize text extracted from the highlighted region of the scanned text document.

Alternatively, a system for extracting highlighted regions in a scanned image document can be implemented, which includes a module 104 and/or 122 for converting a scanned image document into a plurality of background regions and a plurality of mask regions; a module 104 and/or 122 for analyzing the plurality of background regions utilizing one or more mask coordinates, wherein the plurality of background regions are located beneath one or more of the mask regions among the plurality of mask regions; and a module 104 and/or 122 for optically recognizing a highlighted text in one or more mask regions, if the background regions beneath the mast region(s) comprises a uniform color.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for extracting highlighted regions in a scanned text document, comprising:
    converting a color space of a scanned text document comprising a highlighted text within a highlighted region into an sRGB color space by converting said scanned text document into a plurality of background image planes and a plurality of mask binary planes;
    applying constant threshold intervals for each color channel of said sRGB color space;
    extracting said highlighted region from said scanned text document by bounding a color of said highlighted region to a highlighted cuboid in said sRGB color space by determining if each background image plane of said plurality of background image planes is a uniform color;
    extracting said highlighted text from said highlighted cuboid by creating a highlighted region image by setting pixel values of uniform color pixels within said highlighted cuboid to white and remaining pixels within said highlighted region to black; and
    optically recognizing said highlighted text in order to recognize text extracted from said highlighted region image of said scanned text document.

2. The method of claim 1, further comprising:
    generating recognized text, in response to optically recognizing said highlighted text; and
    inserting said recognized text into a new document.

3. The method of claim 2, further comprising:
    summarizing a collection of scanned original text using an optically recognized highlighted text within said scanned text document to generate a summarized document.

4. The method of claim 3 further comprising rendering said summarized document utilizing a printer.

5. The method of claim 3 wherein said summarized document is rendered remotely.

6. The method of claim 5 wherein said summarized document is rendered remotely utilizing an electronic facsimile transmission.

7. The method of claim 5 wherein said summarized document is rendered remotely utilizing electronic mail.

8. The method of claim 3 further comprising electronically storing said summarized within an electronic repository.

9. The method of claim 1 further comprising:
    extracting said highlighted text from said highlighted cuboid utilizing a 4-connected seed fill operation.

10. A method for extracting highlighted regions in a scanned image document, comprising:
    converting a color space of a scanned image document into an sRGB color space;
    converting said sRGB color space into a plurality of background image planes and a plurality of mask binary regions;
    analyzing said plurality of background image planes utilizing at least one mask coordinate, wherein said plurality of background image planes are located beneath at least one mask binary region among said plurality of mask binary regions; and
    optically recognizing a highlighted text in said at least one mask binary region, by setting pixel values of uniform color pixels within said at least one mask binary region to white and remaining pixels within said at least one mask binary region to black if said plurality of background image planes beneath said at least one mask binary region comprises a uniform color.

11. A system for extracting highlighted regions in a scanned text document, comprising:
a data-processing apparatus comprising processor readable code embodied on one or more processor readable storage devices, said processor readable code comprising:
a module for converting a color space of a scanned text document comprising a highlighted text within a highlighted region into an sRGB color space by converting said scanned text document into a plurality of background image planes and a plurality of mask binary planes;
a module for extracting said highlighted region from said scanned text document by bounding a color of said highlighted region to a highlighted cuboid in said sRGB color space by determining if each background image plane of said plurality of background image planes is a uniform color; and
a module for optically recognizing said highlighted text in order to recognize text extracted from said highlighted region of said scanned text document by creating a highlighted region image by setting pixel values of uniform color pixels within said highlighted cuboid to white and remaining pixels within said highlighted region to black.

12. The system of claim 11, further comprising:
a module for generating recognized text, in response to optically recognizing said highlighted text; and
a module for inserting said recognized text into a new document.

13. The system of claim 12, further comprising a collection of scanned original text summarized using an optically recognized highlighted text within said scanned text document to generate a summarized document.

14. The system of claim 13 wherein said summarized document is rendered utilizing a printer.

15. The system of claim 13 wherein said summarized document is rendered remotely.

16. The system of claim 15 wherein said summarized document is rendered remotely utilizing an electronic facsimile transmission.

17. The system of claim 15 wherein said summarized document is rendered remotely utilizing electronic mail.

18. The system of claim 15 wherein said summarized document is electronically stored within an electronic repository.

19. The method of claim 10 further comprising:
extracting said highlighted text from said at least one mask region utilizing a 4-connected seed fill operation.

20. A system for extracting highlighted regions in a scanned image document, comprising:
a data-processing apparatus comprising processor readable code embodied on one or more processor readable storage devices, said processor readable code comprising:
a module for converting a color space of a scanned image document into an sRGB color space;
a module for converting said sRGB color space into a plurality of background image planes and a plurality of mask binary regions;
a module for analyzing said plurality of background image planes utilizing at least one mask coordinate, wherein said plurality of background image planes are located beneath at least one mask binary region among said plurality of mask binary regions; and
a module for optically recognizing a highlighted text in said at least one mask binary region, by setting pixel values of uniform color pixels within said at least one mask binary region to white and remaining pixels within said at least one mask binary region to black if said plurality of background image planes beneath said at least one mask binary region comprises a uniform color.

* * * * *